Dec. 5, 1967  D. W. ROLLINS  3,356,043
COLLAPSIBLE HITCH

Filed Jan. 27, 1966  3 Sheets-Sheet 1

INVENTOR.
DALLAS W. ROLLINS
BY Eugene N. Riddle
ATTORNEY

Dec. 5, 1967 D. W. ROLLINS 3,356,043
COLLAPSIBLE HITCH
Filed Jan. 27, 1965 3 Sheets-Sheet 2
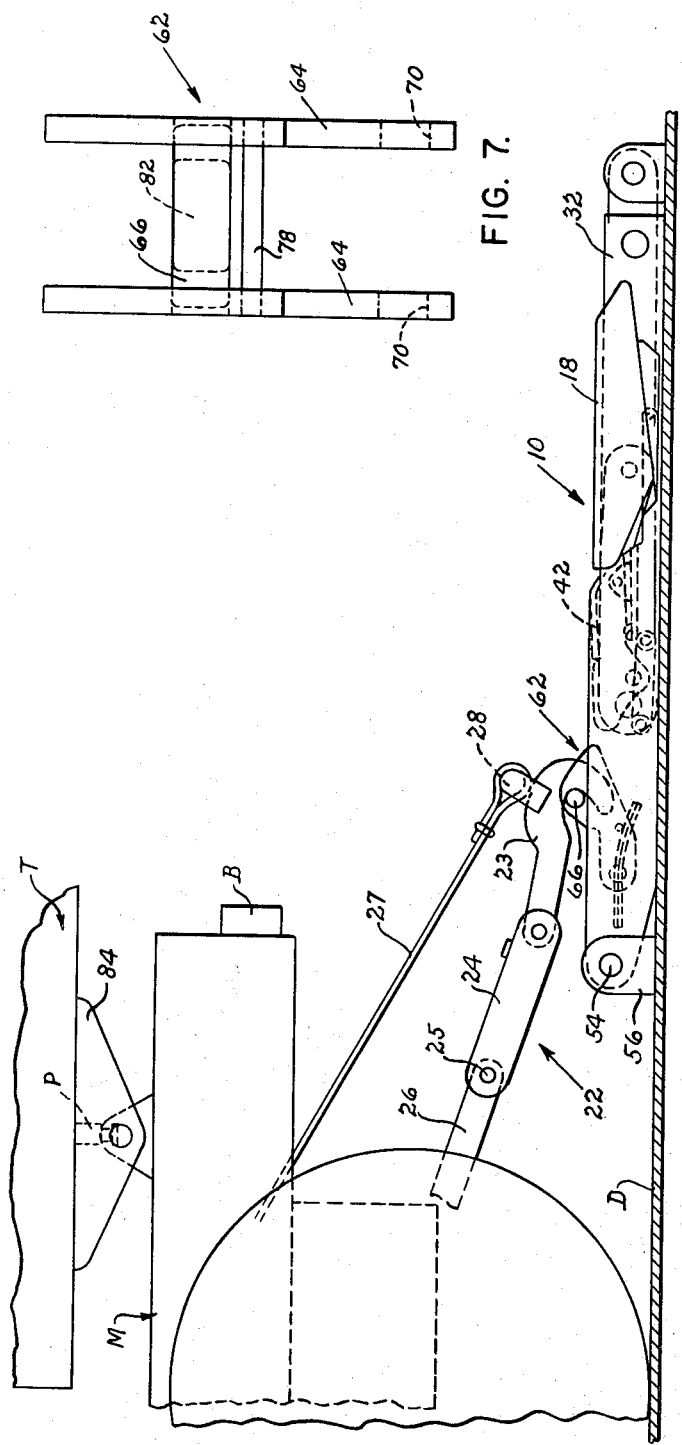
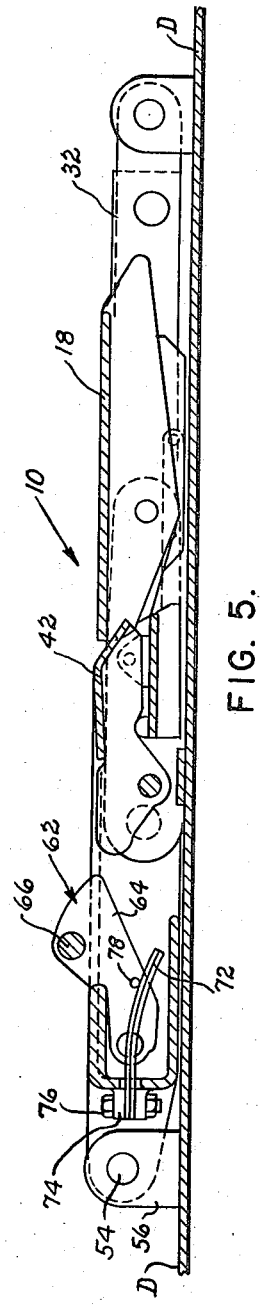
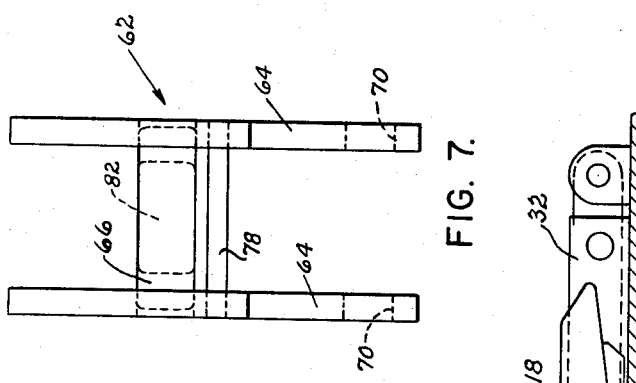

United States Patent Office 3,356,043
Patented Dec. 5, 1967

3,356,043
COLLAPSIBLE HITCH
Dallas W. Rollins, St. Charles, Mo., assignor to ACF Industries, Incorporated, New York, N.Y., a corporation of New Jersey
Filed Jan. 27, 1966, Ser. No. 523,364
6 Claims. (Cl. 105—368)

This invention relates to collapsible hitches and more particularly to a collapsible hitch adapted to be mounted on a railway flat car and to be raised and lowered by a tractor.

Hitches which are raised by a tractor usually have a pull-up member which is engaged by a hook on the tractor. The tractor is then driven forwardly to pivot the hitch to an erect locked position. Then the tractor is driven rearwardly to disengage the hook from the pull-up member. Many of the hooks are of a standard length and are pivoted on the rear end of the tractor.

Tractors are driven over the collapsed hitches when loading and unloading trailers and it is necessary that the tractor clear the collapsed hitches. Heretofore, so-called riser boards or raised platforms have been mounted on the deck of the railway flat car on each side of a collapsed hitch to raise the wheels of the tractor as the tractor moves over the collapsed hitches. Such riser boards are somewhat of a hindrance to the movement of the tractor, particularly if the tractor is driven at a relatively rapid rate of movement over a line of flat cars, and results in a slow-down of the tractors when moving over the riser boards as well as a discomfort to the tractor drivers. Also, the riser boards are costly and must be secured to the deck of the railway flat car.

To eliminate the necessity of riser boards, collapsible hitches which are mounted on railway flat cars having a flush or even deck are constructed so as to project a minimum distance in collapsed position above the deck, such as between around five (5) to seven (7) inches. With such a minimum projection above the deck, tractors may easily straddle and clear the collapsed hitches without the use of riser boards or the like. With hitches of a minimum height above the deck, it is highly desirable to have the pull-up bar or member in a position that is easily accessible to the hook on the tractor and in a position to obtain an adequate initial leverage when the tractor is driven forwardly for erecting the hitch. It is essential, however, that the pull-up member maintain the clearance of the hitch so that a tractor may easily straddle and clear the collapsed hitch.

It is an object of the present invention to provide a tractor operated, collapsible hitch adapted to be mounted on the deck of a railway flat car and to project a minimum distance from the deck so that a tractor may easily straddle and clear the collapsed hitch without the use of riser boards or the like alongside the hitch.

Another object of this invention is the provision of such a hitch having a pull-up member adapted to be easily engaged by means on the rear end of a tractor for moving the hitch from a collapsed position to an erect position.

An additional object is the provision of such a pull-up member for a tractor operated hitch which is within the clearance established by the projection of the collapsed hitch above the deck.

Briefly, this invention comprises a collapsible hitch adapted to be mounted on the flush deck of a railway flat car and to project a minimum height from the deck of the car, the hitch including a pull-up member projecting above the upper surface of the collapsed hitch so as to be easily engaged by means on a tractor and adapted to be yieldingly depressed to a position substantially at the same height as the collapsed height of the hitch if engaged by a tractor or the like driven over the hitch.

The invention accordingly comprises the constructions hereinafter described, the scope of the invention being indicated in the following claims.

In the accompanying drawings in which one of several possible embodiments of the invention is illustrated;

FIGURE 2 is an enlarged elevation of the hitch shown in FIGURE 1 in collapsed position in engagement with a tractor hook and adapted to be raised upon the driving of the tractor in a forward direction;

FIGURE 5 is a side elevation of the hitch in collapsed position with certain parts in section and showing the pull-up member projecting above the upper surface of the hitch;

FIGURE 7 is a front elevation of the pull-up member removed from the hitch.

Corresponding reference characters indicate corresponding parts throughout the several views of the drawings.

Figure 1:
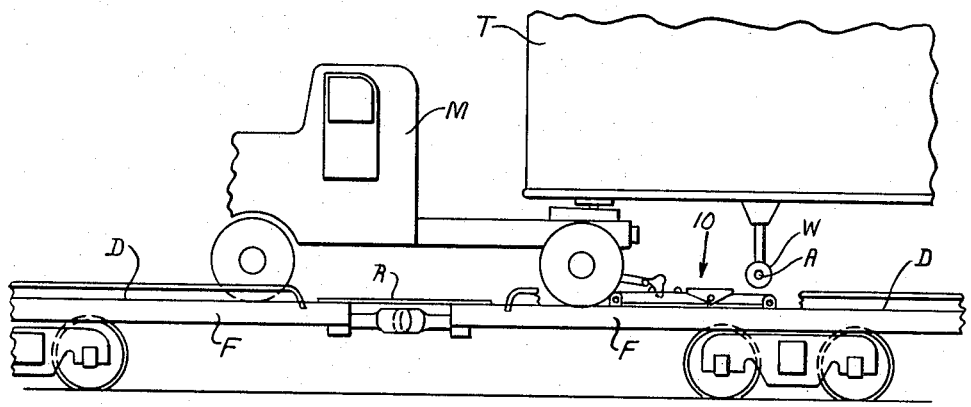
FIGURE 1 is a fragmentary side elevational view of a trailer connected to a tractor and adapted to be secured to a railway flat car by the trailer hitch comprising the present invention, the hitch being illustrated in collapsed position.

Referring to the drawings, and particularly to FIGURE 1, railway flat cars F are coupled to each other and their floors or decks D are spanned by bridge plates R. A tractor M is connected to a trailer T and is supported on bridge plates R when moving from one flat car to another. Decks D are smooth or even without any obstructions whereby tractor M may be easily driven over the decks. A collapsible trailer hitch or support in collapsed position is indicated generally at 10 and is positioned centrally of deck D so that it may be easily straddled by tractor M and trailer T. Trailer T has a kingpin P which is engaged and locked in position by hitch 10 to hold the associated trailer T in a secured position. Dolly wheels W are connected by axle A supported from the underside of trailer T. It is noted that hitch 10 projects a minimum distance above the deck D of railway flat car F and that no riser boards or the like are positioned adjacent hitch 10 for raising the wheels of tractor M or trailer T as it moves over hitch 10.

Hitch 10 comprises a vertical leg or strut generally designated 12 and a diagonal leg generally designated 14 pivotally connected about horizontal pivot 16 to vertical leg 12. A supporting plate structure generally designated 18 is pivotally connected about horizontal pivot 20 to the extending end of vertical leg 12. Hitch 10 is adapted to be pulled from a collapsed position to an erect position upon forward movement of the tractor by a hook generally designated 22 on the rear of tractor M. Hook 22 comprises a hook portion 23 pivotally connected to a link 24. Link 24 is pivotally connected at 25 about a support 26 secured to the rear of tractor M. A cable 27 is secured about an eye 28 on hook portion 23 and is adapted to be wound about a winch (not shown) on tractor M for a pivotal movement of hook portion 23.

Diagonal support member 14 comprises a pair of upper box-shaped diagonal legs 32 connected by a bottom plate 34. Telescoping within each box-shaped leg 32 is a separate lower leg 36 of a generally rectangular cross-sectional area. Each leg 36 is pivotally mounted at 38 to deck D. Upon erection of hitch 10, legs 32 and 36 are held in proper aligned position and locking pins 40 are inserted through aligned openings formed in legs 32 and 36 to lock the diagonal leg 14 in the erect position of the hitch. A push lever 42 is pivotally mounted at 44 to leg 12 and is connected about pivot 48 to a pull rod 46. Pull rod 46 is operatively connected to locking pins 40 for actuating locking pins 40 upon inward movement of push lever 42. Upon rearward movement of tractor M, push lever 42 is contacted by a bumper block B to pull pins 40 from the openings within telescoping legs 32 and 36. To unlock kingpin P before the hitch is collapsed, pivot plate 50 is engaged by push lever 42 to release the kingpin locking means. For further details of supporting plate structure 18 and diagonal 14, reference is made to the copending application of Adam D. Sweda, Ser. No. 417,138, filed Dec. 9, 1964, and entitled, "Collapsible Support," the entire disclosure of which is incorporated by this reference.

Figure 4:
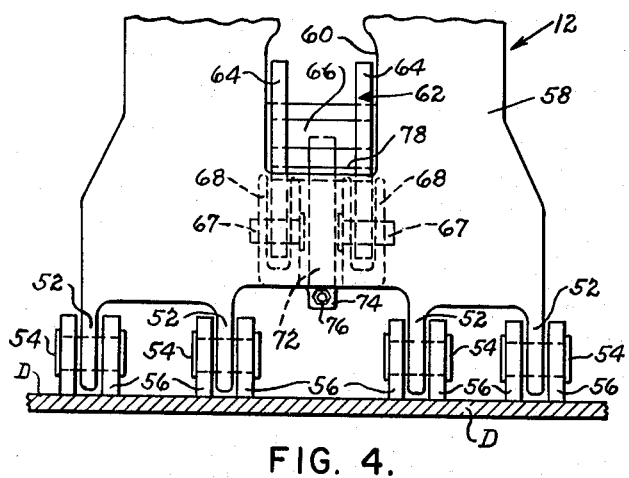
FIGURE 4 is a partial front elevation of the hitch shown in FIGURES 2 and 3.

Vertical leg 12 has lower extensions 52 pivotally mounted at 54 to lugs 56 on deck D. A front plate 58 of vertical leg 12 has an opening 60 therein as shown in FIGURE 4. Mounted within opening 60 is a pull-up member generally indicated 62 and constituting an important feature of this invention. Pull-up member 62 comprises a pair of arms 64 connected by a pull-up bar 66 adapted to be engaged by hook portion 23. Supporting pull-up member 62 for pivotal movement on leg 12 are pins 67 extending through openings 70 of arms 64 and carried by support brackets 68.

Figure 6:
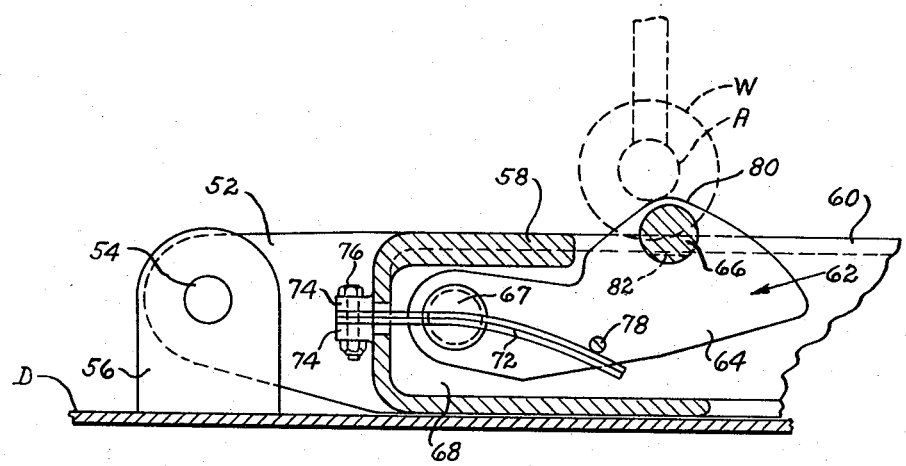
FIGURE 6 is an enlarged fragment of FIGURE 5 but showing the pull-up member cammed downwardly by the dolly wheel axle of a trailer passing over the hitch.

To bias pull-up member 62 to a position where pull-up bar 66 projects above the upper surface of hitch 10 in its collapsed position, a leaf spring 72 is clamped between lugs 74 on leg 12 by a nut and bolt combination 76. Restraining the free end of spring 72 is a rod 78 secured between arms 64. Spring 72 continuously urges rod 78 and pull-up member 62 upwardly from the collapsed position of hitch 10 shown in FIGURE 6. The upper projecting surfaces 80 of arms 64 are rounded so as to provide a relatively smooth contacting surface as will be explained.

Pull-up bar 66 may be provided with a flat 82, if desired, in order to provide an engaging surface for hook portion 23. A fifth wheel 84 is pivotally carried on tractor M and may be raised and lowered as is well known.

Hitch 10 preferably projects a distance of around five (5) to seven (7) inches above the level of deck D which permits a tractor or trailer to straddle the hitch without the use of riser boards or the like. In order for hook 22 to obtain an adequate leverage for pulling hitch 10 about pivot 54 from collapsed position, it is desirable that pull-member 62 project above the upper surface of hitch 10. Additionally, pull-up bar 66 may be easily engaged by hook portion 23 if bar 66 projects above the hitch. Thus, pull-up member 62 may preferably project a distance of two (2) inches or more above the projecting height of the hitch. In the event a low hanging structure on a trailer or tractor, such as a low dolly wheel axle, contacts pull-up member 62, rounded surfaces 80 of arms 64 are engaged to easily cam pull-up member 62 downwardly. After passage of the low hanging structure over pull-up member 62, spring 72 returns pull-up member 62 to its original projecting position.

Figure 3:
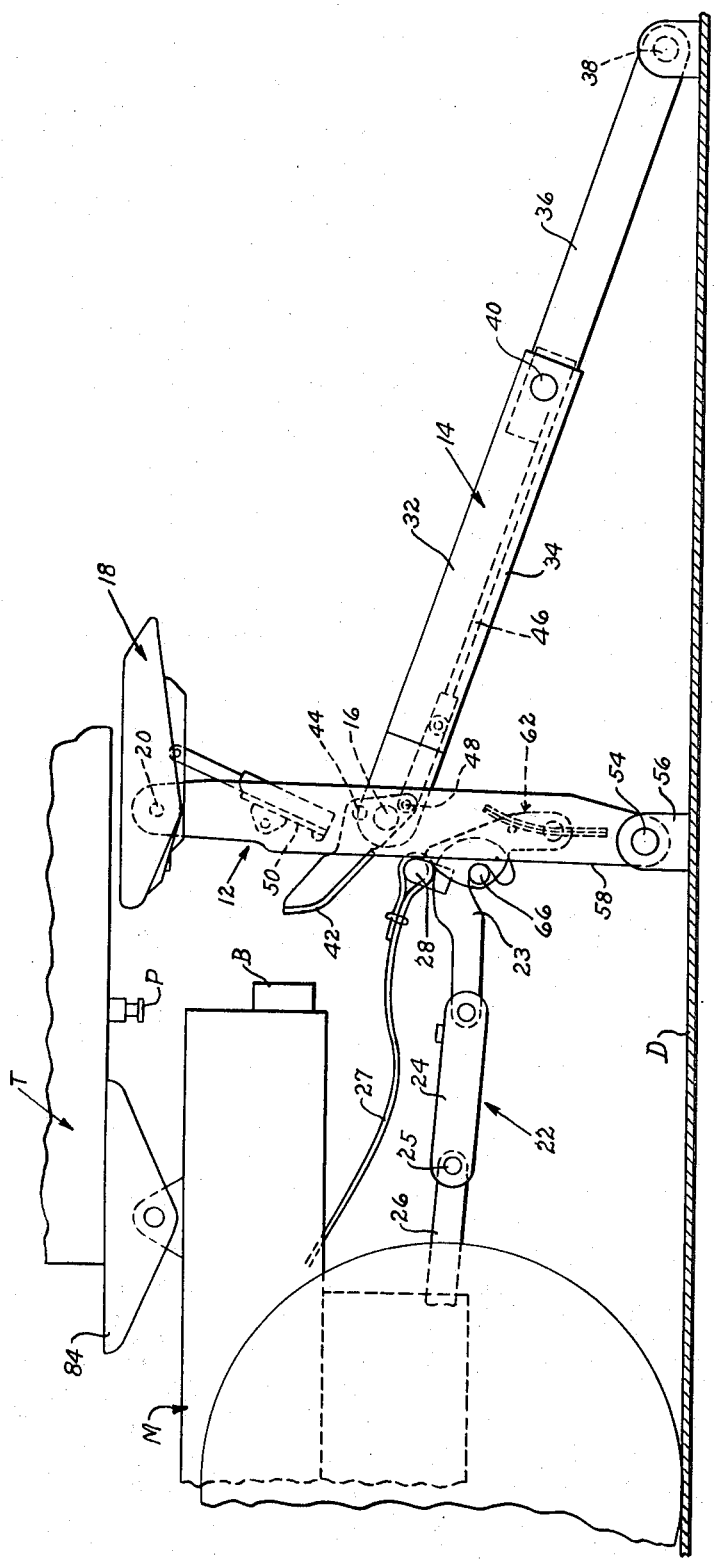
FIGURE 3 is a side elevation of the hitch of FIGURE 2 in erect position and showing the pull-up member engaged by the tractor hook immediately after the hitch has been erected and before the tractor is driven rearwardly for removal of the hook.

Operation is as follows:

To erect hitch 10, tractor M is backed over hitch 10 with kingpin P engaged by fifth wheel 84. Hook portion 23 is manually placed around pull-up bar 66. Fifth wheel 84 is then unlocked from kingpin P and tractor M is driven forwardly pivoting vertical leg 12 to erect position as shown in FIGURE 3 with fifth wheel 84 sliding beneath and relative to trailer T. Trailer T is then lowered into supporting relation on supporting plate structure 18 by lowering of fifth wheel 84. Then tractor M is driven rearwardly to release the tension from hook portion 23. Hook portion 23 may then be removed by actuation of the winch to wind cable 27 and thereby lift hook portion 23 from pull-up bar 66. To secure kingpin P within hitch 10, tractor M is next driven forwardly until a major portion of fifth wheel 84 clears the front end of trailer T. Then fifth wheel 84 is raised and the tractor driven rearwardly with fifth wheel 84 engaging the front corner of trailer T and pushing the trailer and kingpin P rearwardly until engaged by supporting plate structure 18.

From the foregoing, it is to be understood that the present invention is directed to a pull-up member 62 which extends above the relatively low projecting height of a collapsed hitch 10 on the deck of a railway flat car. This arrangement permits pull-up member 62 to be easily engaged by a tractor hook while providing adequate leverage for raising the hitch. The pull-up member 62 is yieldingly mounted so as to be depressed if engaged by a low hanging structure passing over hitch 10.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hitch adapted to be mounted on the deck of a railway flat car, said hitch comprising an elongated leg, means adjacent one end of said leg for mounting said leg on said deck for pivotal movement about a generally horizontal axis between a collapsed position on the deck of the railway car and a generally vertical position in the erect position of the hitch, means carried adjacent the other end of said leg adapted to engage and secure the kingpin of a trailer or the like, means connected to said leg to support said leg in the erect position of the hitch, the upper surface of said leg when in collapsed position on the deck projecting a minimum height above the deck to permit a tractor or the like to easily straddle and clear the hitch, a pull-up member carried by said leg adapted to be engaged by means on a tractor for moving the hitch to an erect position, means mounting the pull-up member on said leg for movement from an extended position in which said pull-up member extends above said upper surface of said leg in the collapsed position of the hitch and a retracted position in which said member is substantially flush with the upper surface of the leg, and means yieldingly urging said pull-up member to said extended position when said leg is in said collapsed position whereby the pull-up member may be easily engaged by said means on said tractor, said pull-up member being depressible downwardly to said retracted position against the bias of said urging means when engaged by a tractor or the like moving over the hitch.

2. A hitch as set forth in claim 1 wherein said pull-up member is mounted intermediate the width of said leg and comprises a generally horizontally extending bar secured between a pair of spaced arm and adapted to be engaged by a hook on a tractor, said arms being mounted for pivotal movement about a generally horizontal axis between extended and retracted positions of the pull-up member.

3. A hitch as set forth in claim 2 wherein said means yieldingly urging said pull-up member to extended position comprises a leaf spring engaging said pull-up member and continuously urging the pull-up member to extended position.

4. A railway flat car having a generally even and smooth deck, a hitch, said hitch comprising an elongated leg, means adjacent one end of said leg mounting said leg on said deck for pivotal movement about a generally horizontal axis between a collapsed position on the deck of the railway car and a generally vertical position in the erect position of the hitch, means carried adjacent the other end of said leg adapted to engage and secure the kingpin of a trailer or the like carried by the railway flat car, means connected to said leg to support said leg in the erect position of the hitch, the upper surface of said leg when in collapsed position on the deck projecting a minimum height above the deck to permit a tractor or the like to easily straddle and clear the hitch, a pull-up member carried by said leg adapted to be engaged by means on a tractor for moving the hitch to an erect position, means mounting the pull-up member on said leg for movement from an extended position in which said pull-up member extends above said upper surface of said leg in the collapsed position of the hitch and a retracted position in which said member is substantially flush with the upper surface of the leg, and means yieldingly urging said pull-up member to said extended position when said leg is in said collapsed position whereby the pull-up member may be easily engaged by said means on said tractor, said pull-up member being depressible downwardly to said retracted position against the bias of said urging means when engaged by a tractor or the like moving over the hitch.

5. A railway flat car as set forth in claim 4 wherein said pull-up member includes a generally horizontally extending bar and is mounted for pivotal movement about a generally horizontal axis between extended and retracted positions.

6. A railway flat car as set forth in claim 5 wherein said means yieldingly urging the pull-up member to extended position comprises a spring continuously urging the pull-up member.

References Cited
UNITED STATES PATENTS 3,279,731  10/1966  Rollins _____ 105—368

ARTHUR L. LA POINT, *Primary Examiner.*

D. E. HOFFMAN. *Assistant Examiner.*